United States Patent
Greene et al.

(10) Patent No.: US 9,805,326 B2
(45) Date of Patent: Oct. 31, 2017

(54) TASK MANAGEMENT INTEGRATED DESIGN ENVIRONMENT FOR COMPLEX DATA INTEGRATION APPLICATIONS

(71) Applicant: International Business Machines Corporation, Armonk, NY (US)

(72) Inventors: Lawrence A. Greene, Plainville, MA (US); Eric A. Jacobson, Arlington, MA (US); Yong Li, Newton, MA (US); Xiaoyan Pu, Chelmsford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 243 days.

(21) Appl. No.: 14/261,213

(22) Filed: Apr. 24, 2014

(65) Prior Publication Data

US 2015/0309769 A1 Oct. 29, 2015

(51) Int. Cl.
*G06F 9/44* (2006.01)
*G06Q 10/06* (2012.01)

(52) U.S. Cl.
CPC ....... *G06Q 10/06316* (2013.01); *G06Q 10/06* (2013.01)

(58) Field of Classification Search
CPC ... G06F 17/30893; G06F 17/30; G06Q 10/10; G06Q 10/06316
See application file for complete search history.

(56) References Cited

U.S. PATENT DOCUMENTS

| | | | |
|---|---|---|---|
| 6,550,057 B1 * | 4/2003 | Bowman-Amuah | G06F 17/30 700/80 |
| 6,748,582 B1 * | 6/2004 | Chiles | G06F 8/30 717/101 |
| 7,433,885 B2 | 10/2008 | Jones | |
| 2002/0120459 A1 * | 8/2002 | Dick | G06Q 10/06316 705/7.26 |
| 2004/0243458 A1 | 12/2004 | Barkan | |

(Continued)

FOREIGN PATENT DOCUMENTS

| | | |
|---|---|---|
| EP | 002058733 A2 | 5/2009 |
| JP | 2013137640 A | 7/2013 |
| WO | 2013102267 A1 | 7/2013 |

OTHER PUBLICATIONS

Carole Goble et al., "State of the nation in data integration for bioinformatics", [Online], 2008, pp. 687-693, [Retrieved from Internet on Jun. 16, 2017], <http://ac.els-cdn.com/S1532046408000178/1-s2.0-S1532046408000178-main.pdf>.*

(Continued)

*Primary Examiner* — Ziaul A Chowdhury
(74) *Attorney, Agent, or Firm* — Patterson + Sheridan, LLP (57) ABSTRACT

Embodiments presented herein provide task management capabilities for designing a complex data integration workflow in an integrated design environment (IDE). A task management tool of the IDE allows a developer to tag various stages of a data integration workflow in a non-linear manner. When the task management tool receives a tag for a given stage, the task management tool identifies incomplete tasks associated with the stage and generates a task list that includes the incomplete tasks. The developer may return to completing any of the tasks in the workflow in any sequence as desired.

11 Claims, 5 Drawing Sheets

(56) References Cited

U.S. PATENT DOCUMENTS

| | | | |
|---|---|---|---|
| 2005/0055662 A1* | 3/2005 | Strausbaugh | G06Q 10/10 717/100 |
| 2006/0048151 A1* | 3/2006 | Haruta | G06Q 10/06 718/100 |
| 2006/0069599 A1* | 3/2006 | Hatoun | G06Q 10/0633 705/7.27 |
| 2007/0083417 A1* | 4/2007 | Wagner | G06Q 10/06311 705/7.13 |
| 2007/0198314 A1* | 8/2007 | Andrew | G06Q 10/06316 705/7.19 |
| 2007/0244735 A1* | 10/2007 | Mital | G06Q 10/10 717/127 |
| 2008/0046834 A1* | 2/2008 | Yu | G06Q 10/06316 715/771 |
| 2008/0141254 A1* | 6/2008 | Lee | G06Q 10/06 718/102 |
| 2008/0147774 A1* | 6/2008 | Tummalapenta | G06Q 10/06 709/202 |
| 2008/0162155 A1* | 7/2008 | Small | G06Q 10/06 705/1.1 |
| 2010/0037127 A1* | 2/2010 | Tomasic | G06Q 10/06 715/224 |
| 2010/0153952 A1* | 6/2010 | Linder | G06F 9/4881 718/101 |
| 2010/0185968 A1 | 7/2010 | Hsu et al. | |
| 2010/0332280 A1* | 12/2010 | Bradley | G06Q 10/06316 705/7.26 |
| 2011/0213631 A1 | 9/2011 | Mislavsky | |
| 2012/0072367 A1* | 3/2012 | Reisbich | G06F 8/20 705/348 |
| 2012/0215578 A1 | 8/2012 | Swierz et al. | |
| 2013/0066670 A1 | 3/2013 | Krishnan Nair | |
| 2013/0067017 A1* | 3/2013 | Carriere | G06Q 10/06 709/208 |
| 2013/0073515 A1* | 3/2013 | Bhide | G06F 17/30563 707/602 |
| 2013/0086116 A1* | 4/2013 | Agarwal | G06F 7/00 707/792 |
| 2013/0145299 A1 | 6/2013 | Steimle et al. | |
| 2013/0187765 A1 | 7/2013 | Smith | |
| 2013/0195429 A1 | 8/2013 | Fay et al. | |
| 2014/0149172 A1* | 5/2014 | Rogut | G06Q 10/06316 705/7.26 |
| 2014/0249833 A1* | 9/2014 | Conti | G06Q 10/06316 705/2 |
| 2014/0344004 A1* | 11/2014 | Surendran | G06Q 10/06316 705/7.26 |
| 2014/0344708 A1* | 11/2014 | Carr | G06Q 10/06 715/751 |
| 2014/0344778 A1* | 11/2014 | Lau | G06F 8/35 717/106 |
| 2016/0321589 A1* | 11/2016 | Powers | G06Q 10/06316 |

OTHER PUBLICATIONS

Giusy Di Lorenzo et al., "Data Integration in Mashups", [Online], ACM 2009, pp. 59-66, [Retrieved from Internet on Jun. 16, 2017], <http://www.cems.uwe.ac.uk/~p-chatterjee/resources/pdf/DataIntegrationInMashups.pdf>.*

William Michener et al., "Data Integration and Workflow Solutions for Ecology", [Online], 2005, pp. 321-324, [Retrieved from Internet on Jun. 16, 2017], <http://www.cs.gonzaga.edu/faculty/bowers/papers/michener_SEEK_dils05.pdf>.*

Shazia Sadiq et al., "Data Flow and Validation inWorkflow Modelling", [Online], 2004, pp. 207-214, [Retrived from Interent on 06/169/2017], <http://delivery.acm.org/10.1145/1020000/1012317/p207-sadiq.pdf>.*

Junwei Cao et al., "GridFlow: Workflow Management for Grid Computing", 2003 IEEE, Piscataway, United States.

* cited by examiner

TASK MANAGEMENT INTEGRATED DESIGN ENVIRONMENT FOR COMPLEX DATA INTEGRATION APPLICATIONS

BACKGROUND

Data integration plays a role in many enterprises. For example, an enterprise may use batch extract, transform, and load (ETL) processes to retrieve data from external sources (e.g., databases), process the data as needed by a given enterprise, and store the data in a destination source (e.g., data warehouses, operational data stores, etc.). A developer creates ETL workflows to process the enterprise data sets.

Integrated design environment (IDE) applications assist developers in designing ETL processes. Many IDEs provide user interfaces that allow developers to easily create workflows, e.g., by using graphical representations of stages and operators to design the workflows. For example, a developer may drag widgets representing database components into a dataflow design canvas. The widgets are associated with business logic needed for the components to properly execute, and the developer need only provide data specific to the component, such as login information, network addresses, resource names, and the like.

SUMMARY

One embodiment of the invention provides a method for managing a design process of a data integration workflow. This method may generally include presenting a design representation of the data integration workflow. The design representation shows each of a plurality of stages included in the data integration workflow. Each stage is associated with a set of tasks performed as part of the data integration workflow. The method may also include receiving a tag to associate with a first one of the stages. The tag indicates that at least a first task associated with the first stage is incomplete. The method may also include updating, based on the received tag, the design representation to reflect that the first stage has at least one incomplete development task.

Another embodiment includes a computer program product, itself comprising a computer-readable storage medium having computer-readable program code embodied therewith, the computer-readable program code configured to perform an operation for managing a design process of a data integration workflow. The operation itself may generally include presenting a design representation of the data integration workflow. The design representation shows each of a plurality of stages included in the data integration workflow. Each stage is associated with a set of tasks performed as part of the data integration workflow. This operation may also include receiving a tag to associate with a first one of the stages. The tag indicates that at least a first task associated with the first stage is incomplete. This operation may also include updating, based on the received tag, the design representation to reflect that the first stage has at least one incomplete development task.

Still another embodiment includes a processor and a memory storing a program, which, when executed on the processor, performs an operation for managing a design process of a data integration workflow. The operation itself may generally include presenting a design representation of the data integration workflow. The design representation shows each of a plurality of stages included in the data integration workflow. Each stage is associated with a set of tasks performed as part of the data integration workflow. This operation may further include receiving a tag to associate with a first one of the stages. The tag indicates that at least a first task associated with the first stage is incomplete. This operation may further include updating, based on the received tag, the design representation to reflect that the first stage has at least one incomplete development task.

DETAILED DESCRIPTION

Integrated design environment (IDE) applications use a variety of techniques to assist a developer in designing stages of a workflow process. For example, a "software wizard" may guide the developer through a set of tasks on a step-by-step basis. At each step, the developer supplies information and data needed to complete the stage. Wizards are useful to developers for designing simple workflows. However, as the data becomes larger and more complex, the workflows also become complex. Generally, wizards have a linear structure and do not provide much flexibility in designing workflows for complex data integration tasks. For instance, when working on a specific step, a developer might not have all of the information at the time to complete that step.

For example, assume a developer wants to add a database connector to a processing stage. To complete this task, the developer may need to provide a username and password, which the developer might not have at the time. As a result, the developer may skip the step and return later. However, because complex data integration workflows include many steps, the developer may have difficulty keeping track of incomplete tasks. In an effort to manage these issues, developers can use task management tools or annotations. However, both approaches lack integration capabilities with the IDE application and thus are unable to correlate a task description to an actual context path (i.e., the stage where the task needs to be completed). This also creates problems when workflows are designed using tables and containers shared by other workflows. For example, if any a shared table or container is modified (e.g., by another developer), unwanted changes may propagate to a workflow, and the developer of that workflow often has no way of discovering the changes until execution of the workflow.

Embodiments presented herein provide task management capabilities for a dataflow design tool in an IDE. More specifically, embodiments provide a task management tool that tracks design tasks and implementation details of a workflow within the IDE itself. In one embodiment, users may place tags on any stage of a data integration workflow. The task management tool receives the tag and, based on the tagged stage, generates a list of incomplete tasks associated with that stage. A task list may include task items within the stage for the developer to complete (e.g., schema definition, column mapping, schema propagation, partitioning method selection, key specification, reject handling, transformation logic, etc.).

The tool integrates task management capabilities with an IDE application by generating a list of incomplete tasks for stages tagged by a developer. Further, the tool allows developers to tag different stages of a complex workflow in a non-linear manner and return to the tagged portions to complete the stage properties or specifications. The developer may tag each stage in any order within the data integration workflow, which allows the developer increased flexibility to design the workflow.

Note, the following description relies on an extract, transform, and load (ETL) architecture as a reference example of a computing infrastructure in which a task management tool assists developers in designing complex workflows to process data. However, one skilled in the art will recognize that the techniques described herein are applicable in other contexts related to tagging incomplete stages of a workflow design and generating a task list based on incomplete steps within the tagged stage. For example, the techniques may generally be adapted to IDEs that allow developers to design workflows for data analysis applications.

Figure 1:
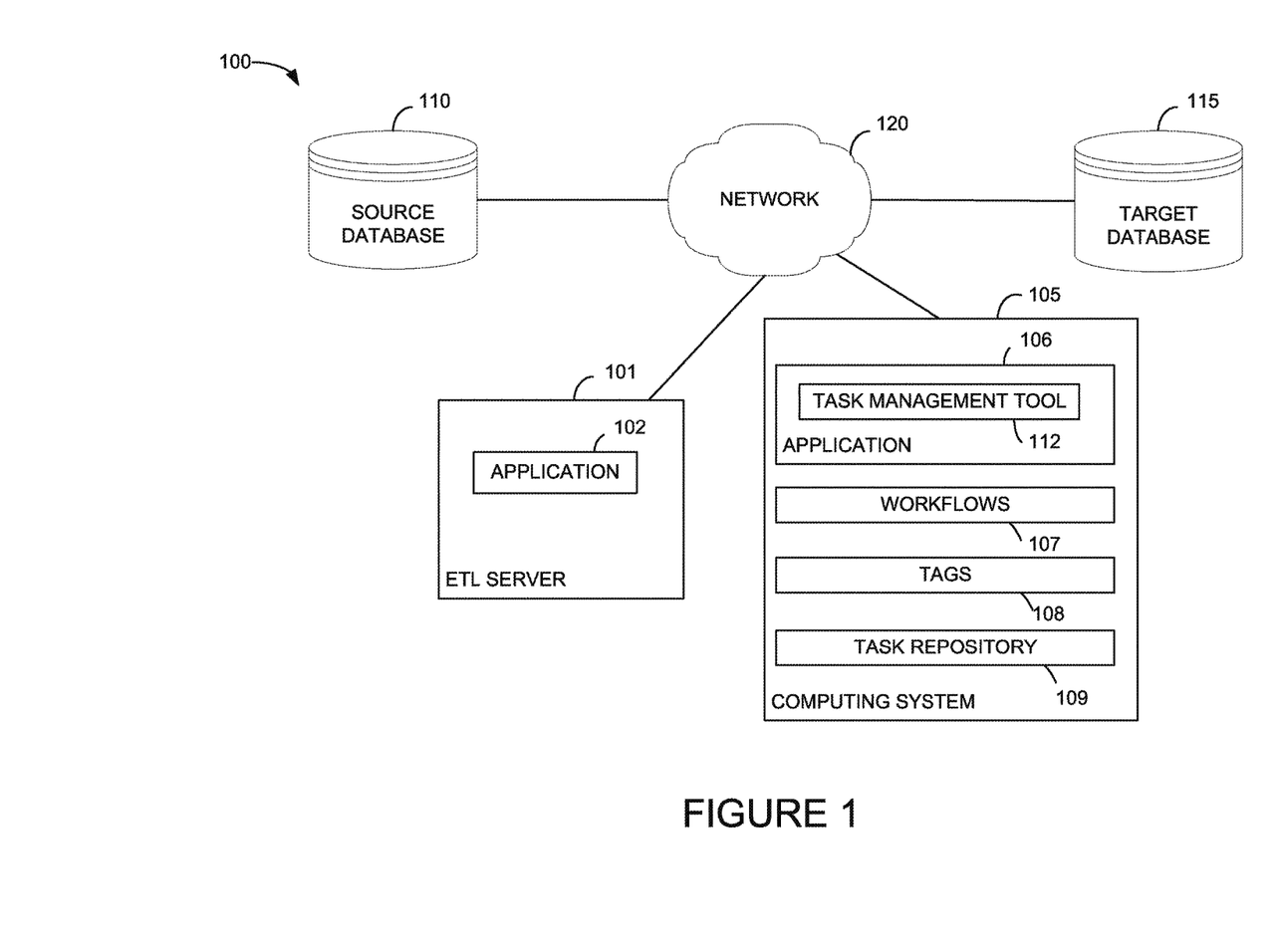
FIG. 1 illustrates an example computing environment, according to one embodiment.

FIG. 1 illustrates an example computing environment 100, according to one embodiment. As shown, the computing environment 100 includes an ETL server 101 connected to a network 120. Generally, the ETL server 101, through an application 102, processes batch jobs in parallel (workflows 107). The workflow 107, in turn, may generally retrieve data from a source database 110, transform the data to conform to specified operational needs, and store the transformed data in a target database 115 (e.g., a data warehouse, a data store, etc.).

A developer may create workflows 107 on an application 106 executing on a computing system 105. In one embodiment, the application 106 provides an integrated design environment (IDE) that assists the developer in designing workflows 107. For instance, the IDE may provide a graphical canvas that allows a developer to visually create a workflow 107 by dragging widgets corresponding to program code onto the canvas. The program code may be generally applicable to steps of the stage, leaving the developer to supply specific information as needed to complete a given step.

Because such specific information might not immediately be available or might be the subject of unmade design choices, the developer may desire to leave a given stage in an incomplete state and return when the information is available (or when design choices have been made). In one embodiment, the application 106 provides a task management tool 112 that tracks incomplete tasks for stages of a given workflow 107. For instance, the task management tool 112 allows a developer to associate a tag 108 with any stage. The tag 108 provides a placeholder and may be used to both remind the developer to return and complete designing the stage as well as what information is needed to resolve what is left incomplete. When the developer places a tag 108 on a particular stage, the task management tool 112 may identify what tasks remain to be completed for that stage. In one embodiment, the task management tool 112 generates a task list for the stage and populates the list with the incomplete tasks.

For example, consider the workflow 107. This example workflow has three stages: (i) retrieving data from the source database 110, (ii) removing duplicate values from the data, and (iii) storing the data into the target database 115. Further, assume the developer drags a database connector widget to the retrieval stage on a canvas provided by IDE application 106 and also places a tag 108 on this stage. A tag 108 indicates development tasks associated with a given stage as well as metadata characterizing each task. The metadata may indicate whether a given task has been completed. When the task management tool 112 receives a tag 108, the task management tool 112 identifies incomplete tasks related to that stage. In this case, such tasks may include supplying a username and password for the database connectivity widget. The task management tool 112 may include these tasks in a list that the developer may access through the application 106. Further, the task management tool 112 may be configured to generate a report that includes task lists associated with each tagged stage.

Further, in one embodiment, task lists generated by the task management tool 112 may also include information or metadata related to database tables and containers used in the stage that are shared across other jobs. Changes to the database tables and containers (e.g., such as changes to properties of the database tables, common code related to the database tables and containers, etc.) in other jobs that also use the tables and containers may propagate to the workflow 107. Changes to the shared database tables and containers made during workflow design may be reflected in the task lists. Therefore, a developer may be made aware of any changes to the tables or containers that propagate to a workflow 107 that the developer is currently designing.

The ETL server 101 and the computing system 105 each may be a physical computing system (e.g., a system in a data center) or may be a virtual computing instance executing within a computing cloud. Although FIG. 1 depicts the ETL server 101 and the computing system 105 as separate systems, the components of each the ETL server 101 and the computing system 105 may run on the same computing system. Further, components of the computing system 105 may further be hosted on separate computing systems. For example, the tags 108 and task repository 109 may reside on a computer system separately from a computer system running the application 106.

Figure 2:
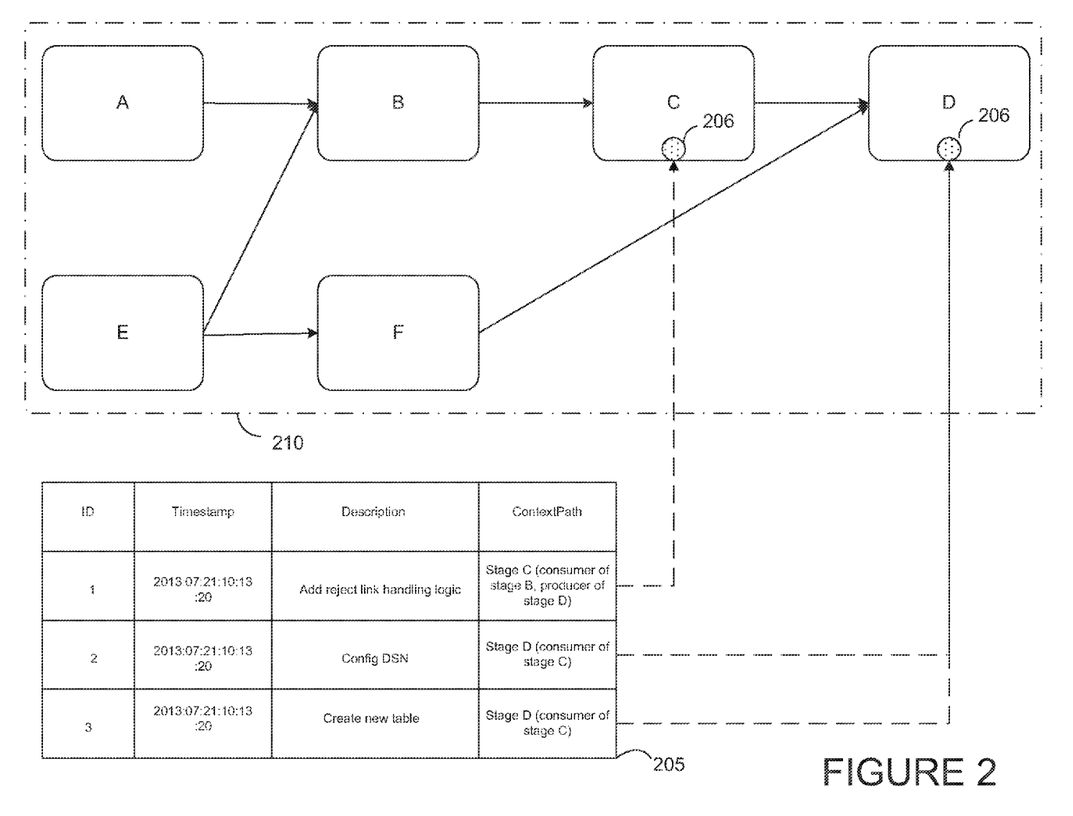
FIG. 2 illustrates an example task repository for a workflow, according to one embodiment.

As stated, the task management tool 112 manages a task repository that stores tasks associated with each tag in a workflow. FIG. 2 illustrates an example task repository 205 associated with an abstraction of an ETL workflow design 210. Illustratively, the workflow design 210 includes multiple stages depicted as lettered boxes connected sequentially by solid-line arrows. The developer may place a tag on any stage (as represented by each dotted circle 206). In response, the task management tool 112 identifies incomplete tasks in the tagged stage. Each task may include several properties. For example, a task may have an identifier, a timestamp, a description of the task, a context path to the original stage associated with the task, and the like. Once identified, the task management tool 112 generates a task list for each stage that includes any incomplete tasks.

The incomplete tasks are stored in the task repository 205. Illustratively, the task repository 205 contains three tasks. In this particular example, a task with the description "Add reject link handling logic" is associated with stage C of the workflow 210; a task with the description "Config DSN" is associated with stage D of the workflow 210; and a task with the description "Create new table" is also associated with stage D.

Illustratively, the context path provides consumer and producer relationships between a given task and a stage. The consumer and producer relationships allow the task management tool 112 to identify where incomplete tasks apply in stages that have multiple links. An example of a stage with such links may be in conditions used to filter or switch outputs (e.g., where the condition is different in each output link).

Figure 3:
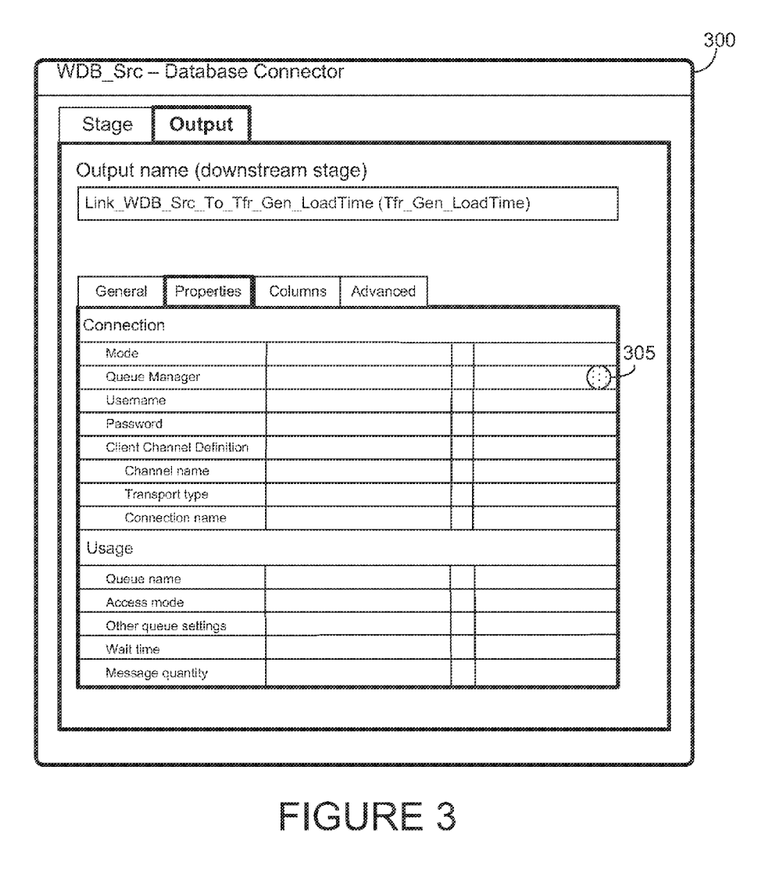
FIG. 3 illustrates an example interface, according to one embodiment.

FIG. 3 illustrates an example interface on IDE 300, according to one embodiment. As shown, the IDE 300 provides a list of widgets associated with a database connector module. The IDE 300 allows a developer to assign a tag on various aspects listed in the interface. Illustratively, the developer has placed a tag 305 (represented by a dotted circle) in the row labeled "Queue Manager." After adding tag 305, the IDE 300 may allow the developer to supply an annotation for the "Queue Manager" row. After the developer enters an annotation, the task management tool 112 identifies incomplete tasks associated with the "Queue Manager" row and registers the annotation and incomplete tasks with the task repository.

In one embodiment, the task management tool 112 may generate a task view that allows the developer to track incomplete tasks associated with a tagged stage in a workflow. Continuing the previous example, the task view may display a listing associated with a queue manager. In the task view, the developer may click on a task. In turn, the task management tool 112 may present the portion of the workflow where the incomplete task originated. For instance, if the developer selects the queue manager, the task management tool 112 may present the menu on the interface of IDE 300 shown in FIG. 3.

Figure 4:
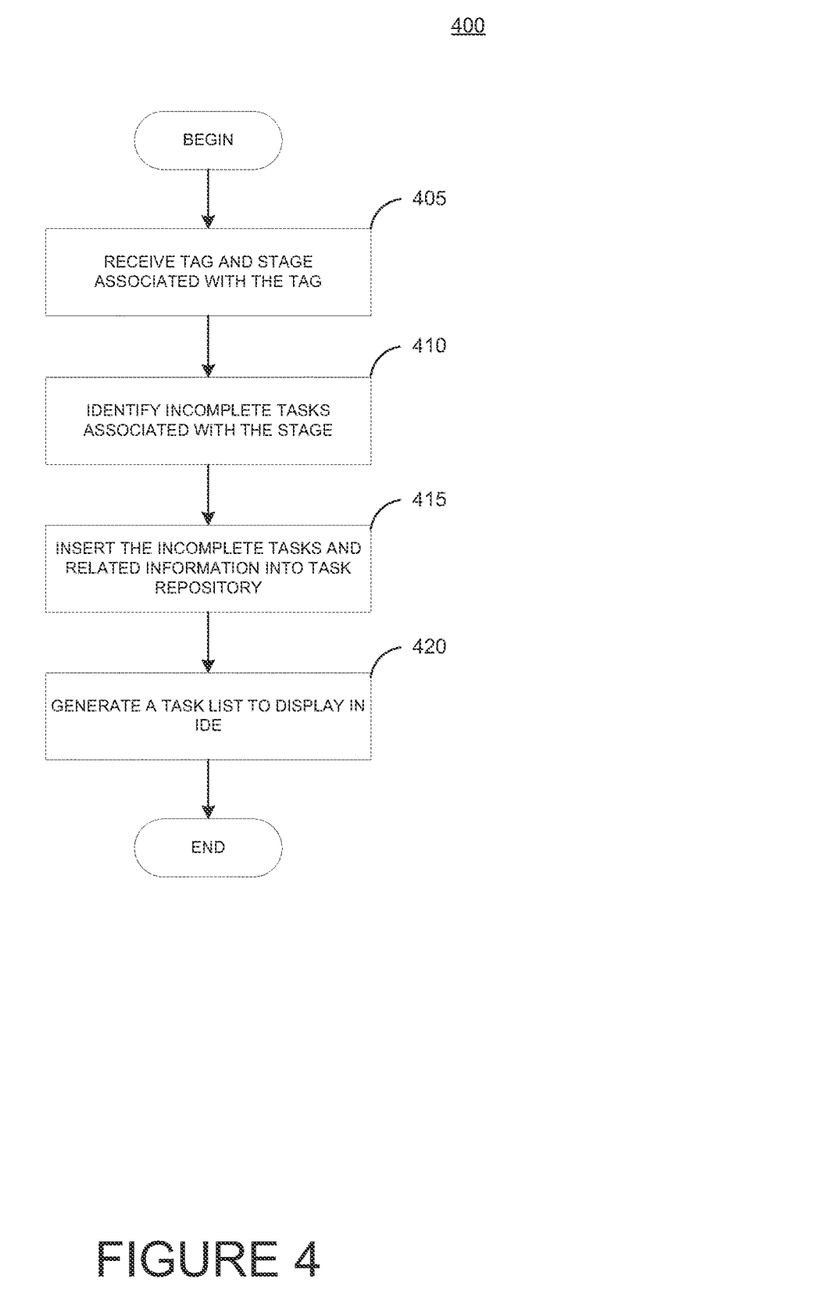
FIG. 4 illustrates a method for managing tasks in a data integration workflow design, according to one embodiment.

FIG. 4 illustrates a method 400 for managing tasks in a workflow using an integrated design environment, according to one embodiment. Assume that a developer is currently designing an ETL workflow in the IDE. In response, the application 106 may display a graphical representation of the workflow to the developer. The workflow itself specifies stages for retrieving data from a source database, removing any duplicate records, sorting the records, and storing the records in a target database. Continuing the example, assume the developer places on a tag associated with configuring a database connector in the data retrieval stage.

As shown, method 400 begins at step 405, where the task management tool 112 receives the tag and a stage associated with the tag. In this case, the task management tool 112 receives the tag associated with the database connector. Further, the task management tool 112 may receive an annotation supplied with the tag.

At step 410, the task management tool 112 identifies incomplete tasks associated with the stage. For example, the task management tool 112 may determine that the stage still requires login information for either the source database or the target database. Further, the task management tool 112 may also identify other information for each task, such as a description, timestamp, and context path of the incomplete task. The task management tool 112 also assigns an identifier to each incomplete task. In one embodiment, the task management tool 112 may also identify shared containers and database tables associated with the tagged stage.

At step 415, the task management tool 112 stores the incomplete tasks and related information into the task repository. Further, the task management tool 112 may also insert any identified shared containers and database tables in the task repository. At step 420, the task management tool 112 generates a task list for the stage to display in the IDE. The task list displays tasks associated with the tagged stage as well as any annotations supplied by the developer. The task list allows the developer to identify and track tasks that need to be completed for a given stage in the workflow. As the developer completes tasks on the task list, the task management tool 112 may remove the tasks from the task repository. Further, if the task management tool 112 detects any changes to any of the shared containers and tables listed in the task repository, the task management tool 112 may update metadata for an affected stage reflecting the changes. In addition, the changes may be reflected in the corresponding task list.

Figure 5:
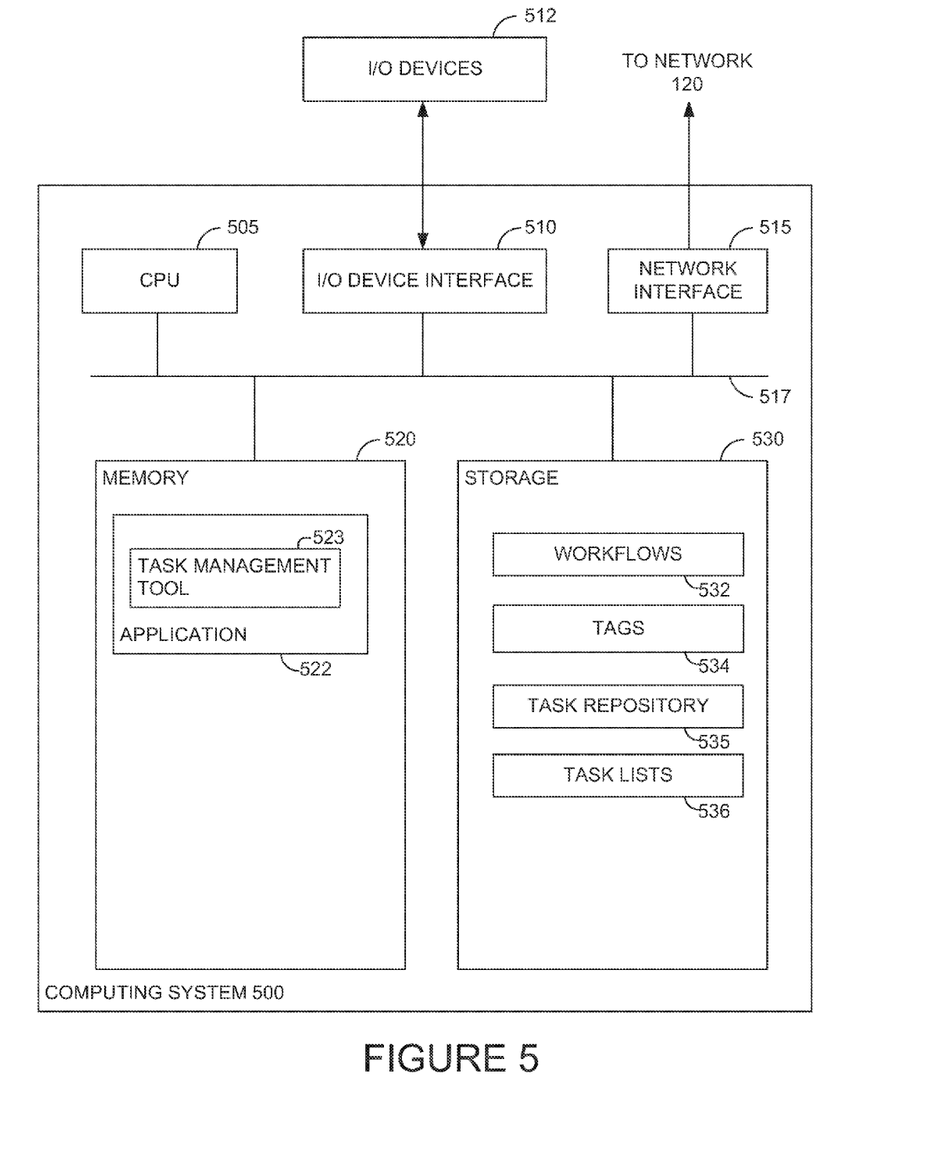
FIG. 5 illustrates an example computing system configured to manage tasks in a data integration workflow design, according to one embodiment.

FIG. 5 illustrates a computing system 500 configured to manage tasks in a workflow through an integrated design environment, according to one embodiment. As shown, the server computing system 500 includes, without limitation, a central processing unit (CPU) 505, a network interface 515, an interconnect (i.e., bus) 517, a memory 520, and storage 530. The server computing system 500 also may include an I/O device interface 510 connecting I/O devices 512 (e.g., keyboard, display, and mouse devices) to the ETL server computing system 500.

The CPU 505 may retrieve and execute programming instructions stored in the memory 520. Similarly, the CPU 505 may retrieve and store application data residing in the memory 520. The interconnect 517 may facilitate transmission, such as of programming instructions and application data, among the CPU 505, I/O device interface 510, storage 530, network interface 515, and memory 520. CPU 505 is included to be representative of a single CPU, multiple CPUs, a single CPU having multiple processing cores, and the like. Additionally, the memory 520 is included to be representative of a random access memory. Furthermore, the storage 530 may be a disk drive storage device. As shown, the memory 520 includes the application 522.

Although shown as a single unit, the storage 530 may be a combination of fixed and/or removable storage devices, such as fixed disc drives, floppy disc drives, tape drives, removable memory cards or optical storage, network attached storage (NAS), or a storage area-network (SAN). As shown, the storage 530 includes workflows 532, tags 534, a task repository 535, and task lists 536.

The application 522 provides an integrated design environment for a developer to design ETL workflows 532. The application 522 includes a task management tool 523. The task management tool 523 allows the developer to manage tasks in designing a workflow 532. To do so, the developer may place a tag 534 to any stage in a given workflow 532. In turn, the task management tool 523 identifies incomplete tasks (e.g., through predefined information about the stage) and inserts the tasks into a task repository 535. The task management tool 523 also generates a task list 536 for the tagged stage that the application 522 may display to the developer through an interface of the application 522.

Advantageously, embodiments disclosed herein provide task management capabilities for a dataflow design tool in an IDE. A task management tool allows a developer to assign a tag at different parts of a workflow design in a non-linear fashion. When the task management tool receives a tag for a given stage, the task management tool generates lists that include incomplete tasks associated with the stage. This approach allows the developer to use the tag as a placeholder at different stages of the workflow design and return to the tagged stage at the developer's convenience.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access application 106 or related data available in the cloud. For example, the task management tool 112 could execute on a computing system in the cloud and manage tasks through tagging workflow stages and generating task lists for the tagged stages. In such a case, the task management tool 112 could maintain the task repository (storing identified tasks associated with a stage) at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for managing a design process of a data integration workflow, the method comprising:
presenting, via a processor, a design representation of the data integration workflow, wherein the design representation shows each of a plurality of stages included in the data integration workflow and wherein each stage is associated with a set of tasks performed as part of the data integration workflow;
receiving a tag to associate with a first one of the stages, wherein the tag indicates that at least a first task associated with the first stage is incomplete and wherein the tag specifies a context path to the first stage indicating producer and consumer relationships between the at least the first task and the first stage;
updating, based on the received tag, the design representation to reflect that the first stage has at least one incomplete development task;
presenting, as part of the design representation, stages of the data integration workflow which have incomplete development tasks;
receiving input completing the set of tasks associated with the first stage;
updating the design representation with an indication that the set of tasks associated with the first stage has been completed;
receiving a selection of one of the stages presented in the design representation; and
presenting a list of incomplete development tasks associated with the selected stage in the graphical representation.

2. The method of claim 1, further comprising, storing the at least the first task in a task repository.

3. The method of claim 1, further comprising, upon receiving an indication that a database table shared with the stage has been modified, updating metadata for the stage with information of the modification.

4. The method of claim 1, wherein the data integration workflow is an extract, transform, and load workflow.

5. A computer program product, comprising:
a non-transitory computer-readable storage medium having computer-readable program code embodied therewith, the computer-readable program code configured to perform an operation for managing a design process of a data integration workflow, the operation comprising:
presenting, via a processor, a design representation of the data integration workflow, wherein the design representation shows each of a plurality of stages included in the data integration workflow and wherein each stage is associated with a set of tasks performed as part of the data integration workflow;
receiving a tag to associate with a first one of the stages, wherein the tag indicates that at least a first task associated with the first stage is incomplete and wherein the tag specifies a context path to the first stage indicating producer and consumer relationships between the at least the first task and the first stage;
updating, based on the received tag, the design representation to reflect that the first stage has at least one incomplete development task;
presenting, as part of the design representation, stages of the data integration workflow which have incomplete development tasks;
receiving input completing the set of tasks associated with the first stage;
updating the design representation with an indication that the set of tasks associated with the first stage has been completed;
receiving a selection of one of the stages presented in the design representation; and
presenting a list of incomplete development tasks associated with the selected stage in the graphical representation.

6. The computer program product of claim 5, wherein the operation further comprises, storing the at least the first task in a task repository.

7. The computer program product of claim 5, wherein the operation further comprises, upon receiving an indication that a database table shared with the stage has been modified, updating metadata for the stage with information of the modification.

8. The computer program product of claim 5, wherein the data integration workflow is an extract, transform, and load workflow.

9. A system, comprising:
a processor; and
a memory storing a program, which, when executed on the processor, performs an operation for managing a design process of a data integration workflow, the operation comprising:
presenting a design representation of the data integration workflow, wherein the design representation shows each of a plurality of stages included in the data integration workflow and wherein each stage is associated with a set of tasks performed as part of the data integration workflow;
receiving a tag to associate with a first one of the stages, wherein the tag indicates that at least a first task associated with the first stage is incomplete and wherein the tag specifies a context path to the first stage indicating producer and consumer relationships between the at least the first task and the first stage;
updating, based on the received tag, the design representation to reflect that the first stage has at least one incomplete development task;
presenting, as part of the design representation, stages of the data integration workflow which have incomplete development tasks;
receiving input completing the set of tasks associated with the first stage;
updating the design representation with an indication that the set of tasks associated with the first stage has been completed;
receiving a selection of one of the stages presented in the design representation; and
presenting a list of incomplete development tasks associated with the selected stage in the graphical representation.

10. The system of claim 9, wherein the operation further comprises, upon receiving an indication that a database table shared with the stage has been modified, updating metadata for the stage with information of the modification.

11. The system of claim 9, wherein the data integration workflow is an extract, transform, and load workflow.

* * * * *